US010293676B2

(12) United States Patent
Schnapp et al.

(10) Patent No.: US 10,293,676 B2
(45) Date of Patent: May 21, 2019

(54) VEHICLE HAVING NON-AXIAL DRIVE

(71) Applicant: Piaggio Fast Foward, Inc., Boston, MA (US)

(72) Inventors: Jeffrey T. Schnapp, Cambridge, MA (US); Gregory Stewart Lynn, Venice, CA (US); Joshua Eldred Elvander, Somerville, MA (US); Sasha Priya Hoffman, Boston, MA (US); Suhas Subhaschandra Malghan, Swampscott, MA (US); Nazareth V. Ekmekjian, Cambridge, MA (US); Rossitza Dimitrova Kotelova, Cambridge, MA (US); Bethanne Altringer, Cambridge, MA (US); Jamar A. Bromley, Jamaica Plain, MA (US)

(73) Assignee: PIAGGIO FAST FORWARD, INC., Boston, MA (US)

( * ) Notice: Subject to any disclaimer, the term of this patent is extended or adjusted under 35 U.S.C. 154(b) by 277 days.

(21) Appl. No.: 15/296,879

(22) Filed: Oct. 18, 2016

(65) Prior Publication Data

US 2018/0105033 A1 Apr. 19, 2018

(51) Int. Cl.
*B62K 11/00* (2006.01)
*B60K 7/00* (2006.01)
(Continued)

(52) U.S. Cl.
CPC .............. *B60K 7/0007* (2013.01); *B60K 1/04* (2013.01); *B60K 17/043* (2013.01); *B62D 37/04* (2013.01);
(Continued)

(58) Field of Classification Search
CPC .. B60K 17/00; B60K 17/0007; B60K 17/043; B62K 11/007
(Continued)

(56) References Cited

U.S. PATENT DOCUMENTS 282,299 A * 7/1883 Freeman .............. B60K 17/043 180/10
1,819,924 A * 8/1931 Seppola ............... B60K 17/043 180/10
(Continued)

FOREIGN PATENT DOCUMENTS

CN 104590476 A 5/2015
EP 2058216 A1 5/2009
(Continued)

OTHER PUBLICATIONS

International Search Report and Written Opinion dated Feb. 20, 2017 in PCT Application No. PCT/US2016/057529.
(Continued)

*Primary Examiner* — Joseph M Rocca
*Assistant Examiner* — Daniel S Yeagley
(74) *Attorney, Agent, or Firm* — Onello & Mello, LLP

(57) ABSTRACT

A two-wheeled vehicle is provided. The two-wheeled vehicle includes a chassis having a height, a length and a width, a first wheel rotatably connected to the chassis, the first wheel having a perimeter, a diameter and a geometric center, and the diameter of the first wheel being at least 75% of the height of the chassis, a motor for providing a drive energy to the first wheel, an axle rotated by the motor, a drive gear connected with the axle such that the drive gear rotates with a rotation of the axle, and a plurality of teeth disposed about the first wheel and mechanically engaged with the drive gear at a location closer to the perimeter of the first wheel than to the geometric center of the first wheel.

21 Claims, 15 Drawing Sheets

(51) Int. Cl.

| | |
|---|---|
| ***B60K 1/04*** | (2019.01) |
| ***B62D 37/04*** | (2006.01) |
| ***B60K 17/04*** | (2006.01) |
| ***F16H 7/02*** | (2006.01) |
| ***F16H 7/12*** | (2006.01) |
| ***B62M 7/12*** | (2006.01) |
| ***B62M 11/00*** | (2006.01) |
| ***B62K 7/04*** | (2006.01) |
| *B60K 5/00* | (2006.01) |
| *F16H 7/08* | (2006.01) |

(52) U.S. Cl.

CPC .............. *B62K 7/04* (2013.01); *B62K 11/007* (2016.11); *B62M 7/12* (2013.01); *B62M 11/00* (2013.01); *F16H 7/023* (2013.01); *F16H 7/12* (2013.01); *B60K 5/00* (2013.01); *B60K 17/04* (2013.01); *B60K 2001/0405* (2013.01); *B60K 2007/003* (2013.01); *B60K 2007/0061* (2013.01); *B60Y 2200/80* (2013.01); *B60Y 2200/91* (2013.01); *F16H 2007/0842* (2013.01)

(58) Field of Classification Search

USPC .......................................................... 180/218

See application file for complete search history.

(56) References Cited

U.S. PATENT DOCUMENTS

| | | | | | |
|---|---|---|---|---|---|
| 3,418,005 | A * | 12/1968 | Allina | B62B 1/08 | 280/47.26 |
| 4,179,006 | A * | 12/1979 | Lenack | B60K 17/043 | 180/10 |
| 5,094,375 | A * | 3/1992 | Wright | B60R 7/02 | 224/404 |
| 7,017,696 | B2 * | 3/2006 | Pal | B60K 7/0007 | 180/218 |
| 7,337,862 | B1 | 3/2008 | Greenley et al. | | |
| 8,083,013 | B2 | 12/2011 | Bewley et al. | | |
| 8,123,237 | B2 * | 2/2012 | Takemura | F16M 3/00 | 280/105 |
| 8,170,781 | B2 | 5/2012 | Fuwa | | |
| 8,684,123 | B2 * | 4/2014 | Chen | B62K 11/007 | 180/218 |
| 9,010,474 | B2 * | 4/2015 | Martinelli | B62K 3/007 | 180/218 |
| 10,173,738 | B2 * | 1/2019 | Schnapp | B62D 37/04 | |
| 2001/0042650 | A1 * | 11/2001 | van den Berg | B62K 1/00 | 180/218 |
| 2002/0011368 | A1 * | 1/2002 | Berg | B60K 7/00 | 180/218 |
| 2005/0016785 | A1 * | 1/2005 | Young | B62M 6/60 | 180/206.5 |
| 2010/0057319 | A1 | 3/2010 | Inaji et al. | | |
| 2010/0070132 | A1 * | 3/2010 | Doi | B60L 15/20 | 701/36 |
| 2010/0168993 | A1 * | 7/2010 | Doi | B60L 15/00 | 701/124 |
| 2011/0220427 | A1 | 9/2011 | Chen | | |
| 2013/0032423 | A1 * | 2/2013 | Chen | A63C 17/0073 | 180/218 |
| 2015/0012163 | A1 | 1/2015 | Crawley | | |
| 2016/0031515 | A1 | 2/2016 | Andreev | | |
| 2016/0068056 | A1 | 3/2016 | Burtov et al. | | |
| 2019/0031017 | A1 * | 1/2019 | Hays | B60G 7/006 | |

FOREIGN PATENT DOCUMENTS

| | | | |
|---|---|---|---|
| GB | 2516619 | A | 2/2015 |
| JP | 2004129435 | A | 4/2004 |
| JP | 3993883 | B2 | 10/2007 |
| WO | 0115962 | A1 | 3/2001 |

OTHER PUBLICATIONS

Huang et al., "Modeling and Velocity Control for a Novel Narrow Vehicle Based on Mobile Wheeled Inverted Pendulum", IEEE Transactions on Control Systems Technology, vol. 21 No. 5, Sep. 2013, pp. 1607-1617. (Year: 2013).

Huang et al., "Nonlinear Disturbance Observer-Based Dynamic Surface Control of Mobile Wheeled Inverted Pendulum", IEEE Transactions on Control Systems Technology, vol. 23 No. 6, Nov. 2015, pp. 2400-2407. (Year: 2015).

Beroud, Annick. "L'intralogistique au service de la performance" à la matinale de I'Aslog (with English machine translation) L'antenne, Sep. 27, 2016. Retrieved from URL: http://www.lantenne.com/L-intralogistique-au-service-de-la-performance-a-la-matinale-de-I-Aslog_a33383.html.

Goher, K. M., et al. Dynamic Modeling and Control of a Two Wheeled Robotic Vehicle With a Virtual Payload, ARPN Journal of Engineering and Applied Sciences, vol. 6, No. 3, Mar. 2011.

Hay, Benjamin. TwinswHeel, le livreur de colis de demain? (with English machine translation) Tumblr French IoT, Oct. 6, 2016. Retrieved from URL: http://french-iot.tumblr.com/post/151417346436/twinswheel-le-livreur-de-colis-de-demain-la.

Hu, J., & Yan, G. (2014). Analysis of two-wheeled self-balancing mobile robots based on ADRC. Jidian Gongcheng/Mechanical & Electrical Engineering Magazine, 31(2), 159-164. doi:http://dx.doi.org/10.3969/j.issn.1001-4551.2014.02.006—Abstract Only.

Ji, P., Zhu, Y., Cheng, C. et al. (2014). Design of self-balancing two-wheeled vehicle control system based on STM32. Dianzi Keji—Electronic Science and Technology, 27(11), 96-99, 105. Retrieved from http://search.proquest.com/docview/1651444797?accountid=10920—Abstract Only.

Larimi, S. R., Zarafshan, P., & Moosavian, S. A. A. A new stabilization algorithm for a two-wheeled mobile robot aided by reaction wheel. Journal of Dynamic Systems, Measurement, and Control (Transactions of the ASME), vol. 137, No. 1, Jan. 2015.

Libeskind, Jerome. A quoi ressemblera le dernier kilometre dans 10 ans? (with English machine translation) Logicites. Sep. 26, 2016. Retrieved from URL: http://www.logicites.fr/2016/09/26/a-quoi-ressemblera-dernier-kilometre-10-ans/.

Rahman, M. T. A., Ahmad, S., Akmeliawati, R. et al. Centre of gravity (C.O.G)-based analysis on the dynamics of the extendable double-link two-wheeled mobile robot. IOP Conference Series: Materials Science and Engineering, vol. 53, No. 1, 2013.

Ruan, X., Chen, J., Cai, J. et al. (2011). Research on stable control for two-wheeled self-balancing robot in complex environment. Beijing Gongye Daxue Xuebao (Journal of Beijing University of Technology), 37(9), 1310-1316. Retrieved from http://search.proquest.com/docview/963872724?accountid=10920—Abstract Only.

Sales J. Marti, J. V., Mann, R. et al. CompaRob: the shopping cart assistance robot. International Journal of Distributed Sensor Networks, 2016.

Van der Wijk, V., & Herder, J. L. Force balancing of variable payload by active force-balanced reconfiguration of the mechanism. In Reconfigurable Mechanisms and Robots, 2009. ReMAR 2009. ASME/IFToMM International Conference, IEEE, Jun. 2009.

Wang, Kun, et al. Enhanced active dynamic balancing of the planar robots using a three-rotating-bar balancer, Advances in Mechanical Engineering, vol. 8, No. 4, pp. 1-10, 2016.

Wu, K., Li, W., Liu, C. et al. (2006). Dynamic control of two-wheeled mobile robot. Yuhang Xuebao / Journal of Astronautics, 27(2), 272-275. Retrieved from http://search.proquest.com/docview/29224261?accountid=10920—Abstract Only.

YouTube video uploaded on Sep. 15, 2016, titled "TwinswHeel Lyon 2016 09 13 EN" downloaded from: https://www.youtube.com/watch?v=ysYtN3Wm5Dw&feature=youtu.be on Jan. 19, 2017.

YouTube video uploaded on Nov. 21, 2016, titled "TwinswHeel M6 1945 2016 11 18" downloaded from: https://www.youtube.com/watch?v=e3laoGU56nY&feature=youtu.be on Jan. 19, 2017.

Zhao Y. Woo, C. & Lee, J. (2015). Balancing control of mobile

(56) References Cited

OTHER PUBLICATIONS manipulator with sliding mode controller. International Conference on Control, Automation and Systems (ICCAS), 802-805.

* cited by examiner

VEHICLE HAVING NON-AXIAL DRIVE

TECHNICAL FILED

The present description relates generally to vehicles, and more particularly, but not exclusively, to a vehicle having a non-axial drive system.

BACKGROUND

Vehicles often include various numbers, sizes and configurations of wheels used for converting a propulsive force into vehicle motion. Such wheels are generally rotatably attached, directly or indirectly, to the vehicle. The wheels rotate about a rotational axis and a connection between the wheel and vehicle, or a drive path between a propulsion source and the wheel, is generally located co-axially with the rotational axis. However, such an attachment and drive arrangement between existing vehicles and wheels may limit vehicle design or vehicle performance characteristics.

SUMMARY

According to various aspects of the subject technology, a two-wheeled vehicle is provided. According to one aspect, the two-wheeled vehicle includes a chassis having a height, a length and a width, a first wheel rotatably connected to the chassis, the first wheel having a perimeter, a diameter and a geometric center, and the diameter of the first wheel being at least 75% of the height of the chassis, a motor for providing a drive energy to the first wheel, an axle rotated by the motor, a drive gear connected with the axle such that the drive gear rotates with a rotation of the axle, and a plurality of teeth disposed about the first wheel and mechanically engaged with the drive gear at a location closer to the perimeter of the first wheel than to the geometric center of the first wheel.

According to some aspects of the subject technology, a two-wheeled vehicle includes a chassis having a height, a length and a width, a first wheel rotatably connected to the chassis, the first wheel having a perimeter, a diameter and a geometric center, and the diameter of the first wheel being at least 75% of the height of the chassis, drive means for providing a drive energy to the first wheel, said drive means being coupled to the chassis, and coupling means for coupling the drive means to the first wheel, said coupling means mechanically engaging with the first wheel at a location closer to the perimeter of the first wheel than to the geometric center of the first wheel.

BRIEF DESCRIPTION OF THE DRAWINGS

The accompanying drawings, which are included to provide further understanding and are incorporated in and constitute a part of this specification, illustrate disclosed aspects and together with the description serve to explain the principles of the disclosed aspects.

The following figures are included to illustrate certain aspects of the present disclosure, and should not be viewed as exclusive implementations. The subject matter disclosed is capable of considerable modifications, alterations, combinations and equivalents in form and function, without departing from the scope of this disclosure.

DETAILED DESCRIPTION

Figure 1:
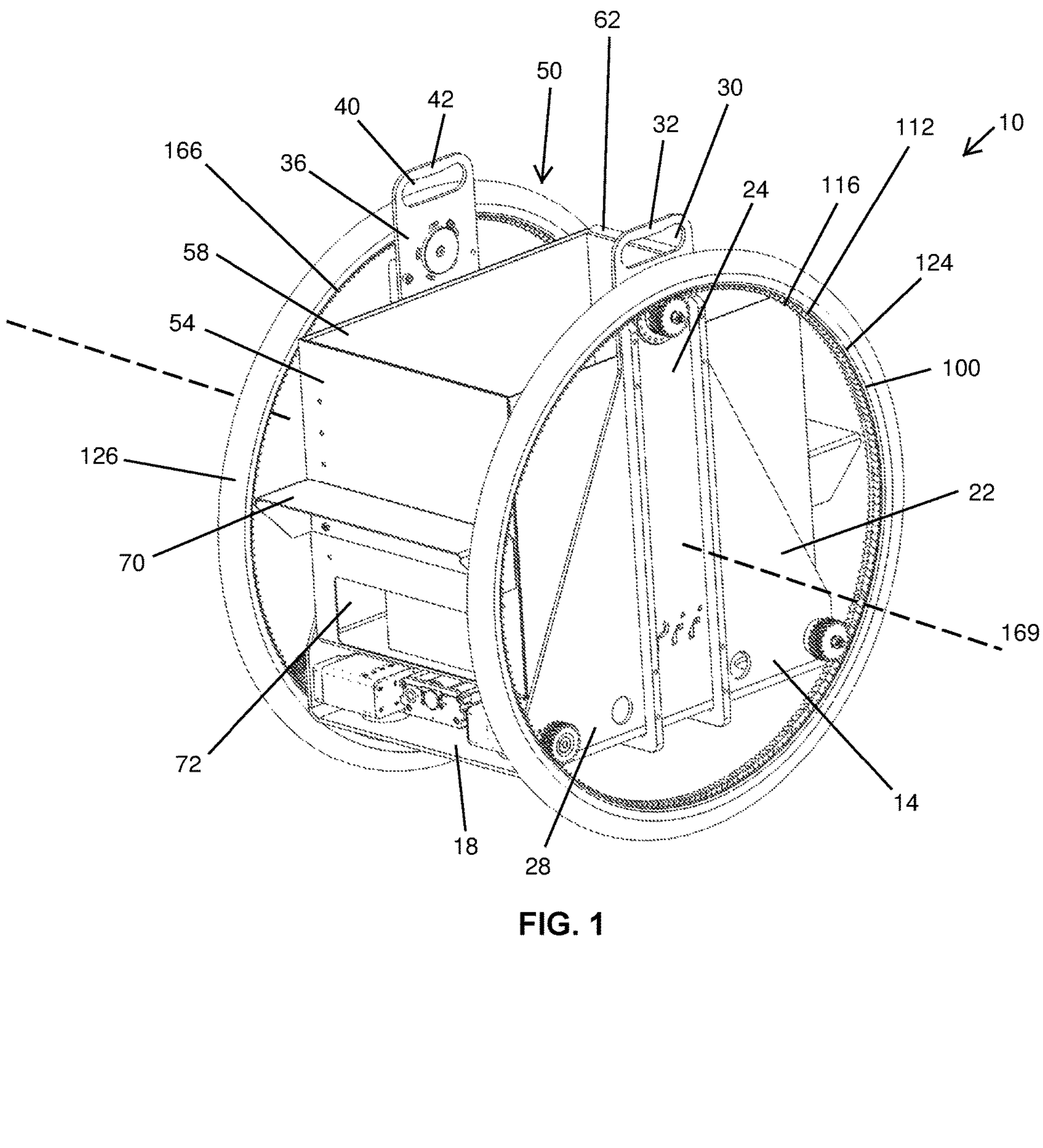
FIG. 1 is an upper perspective view of a vehicle according to a first implementation of the present disclosure.

While this disclosure is susceptible of implementations in many different forms, there is shown in the drawings and will herein be described in detail implementations of the disclosure with the understanding that the present disclosure is to be considered as an exemplification of the principles of the disclosure and is not intended to limit the broad aspects of the disclosure to the implementations illustrated.

Disclosed herein are various implementations of a vehicle. In certain aspects, as shown in FIGS. 1-4, the present disclosure provides a vehicle 10. The vehicle 10 includes a chassis 14. The chassis 14 defines a height 15, a length 16 and a width 17 of the vehicle 10. In certain implementations, the chassis 14 includes a floor 18 and a first sidewall 22. The floor 18 and the first sidewall 22 are joined at a substantially right angle, although other arrangements are within the scope of this disclosure. The first sidewall 22 includes a first sidewall upper portion 24, a first sidewall lower portion 28 and a first sidewall aperture 30. The first sidewall aperture 30 is disposed at the first sidewall upper portion 24 and forms a first handle 32.

The chassis 14 also includes a second sidewall 34. The floor 18 and the second sidewall 34 are joined at a substantially right angle, although other arrangements are within the scope of this disclosure. The second sidewall 34 includes a second sidewall upper portion 36, a second sidewall lower portion 38 and second sidewall aperture 40. The second sidewall aperture 40 is disposed at the second sidewall upper portion 36 and forms a second handle 42.

Figure 2:
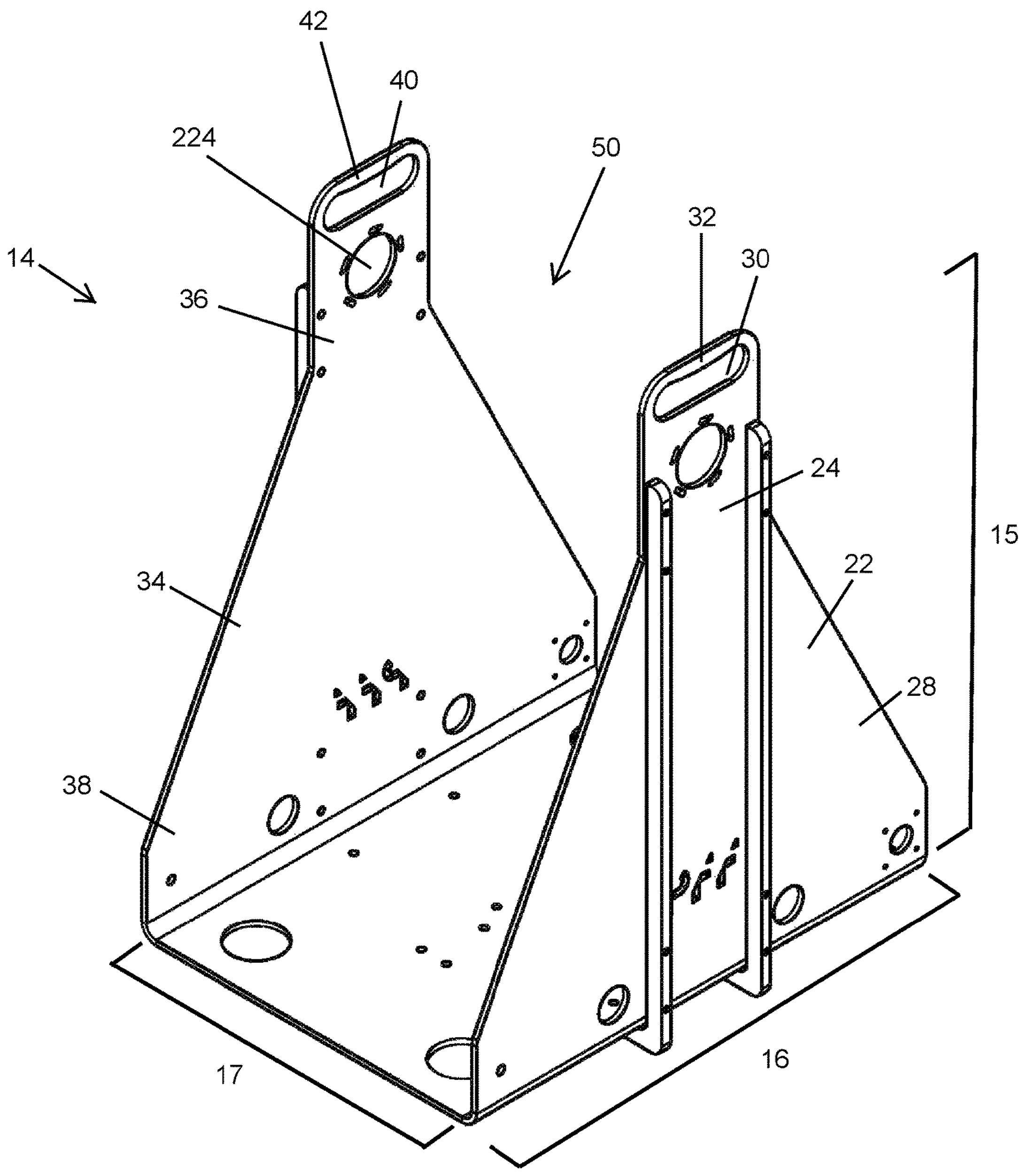
FIG. 2 is an upper perspective view of a chassis according to the first implementation of the present disclosure.
Figure 3:
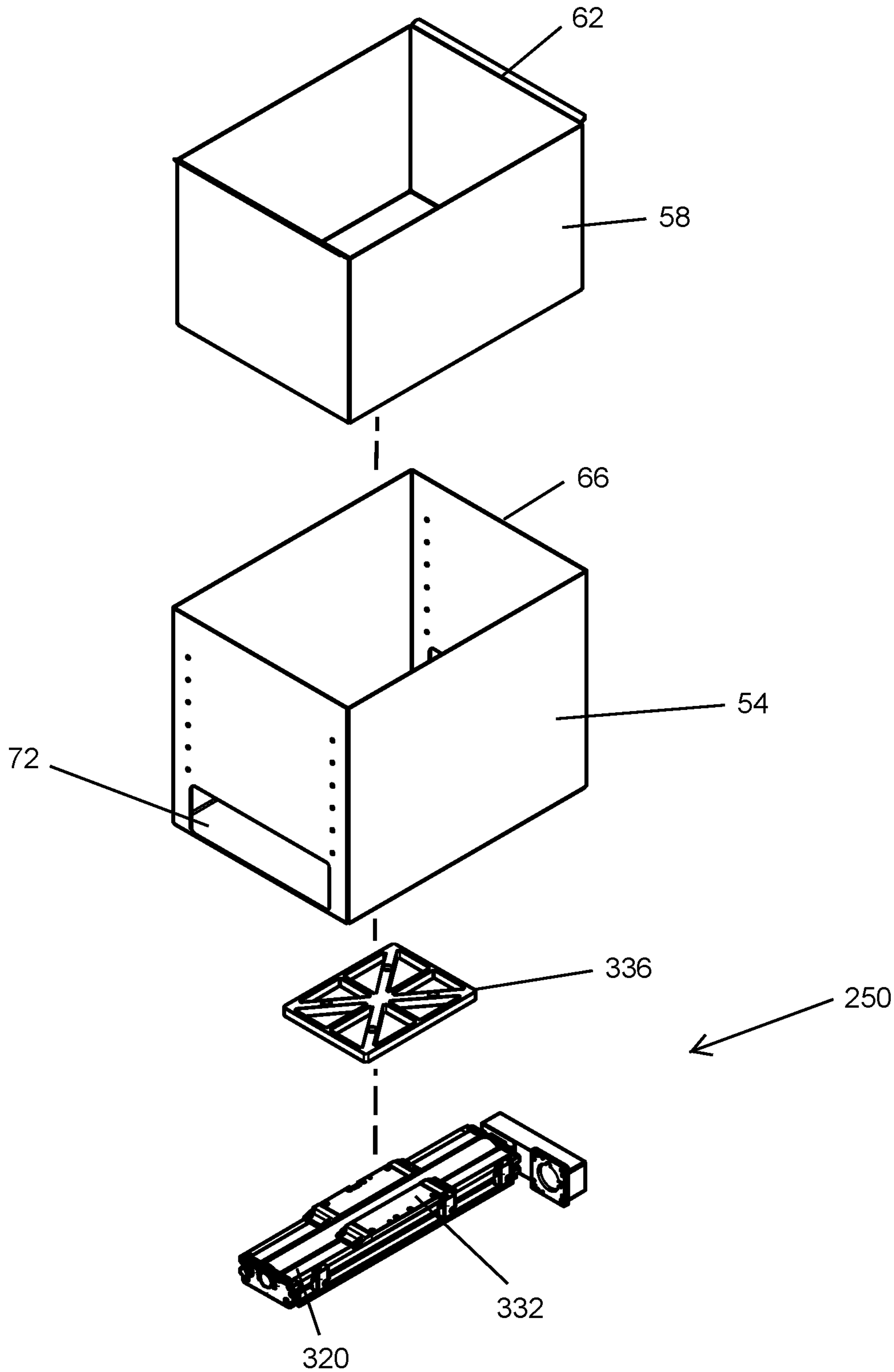
FIG. 3 is a view showing several components of the first implementation of a vehicle.
Figure 4:
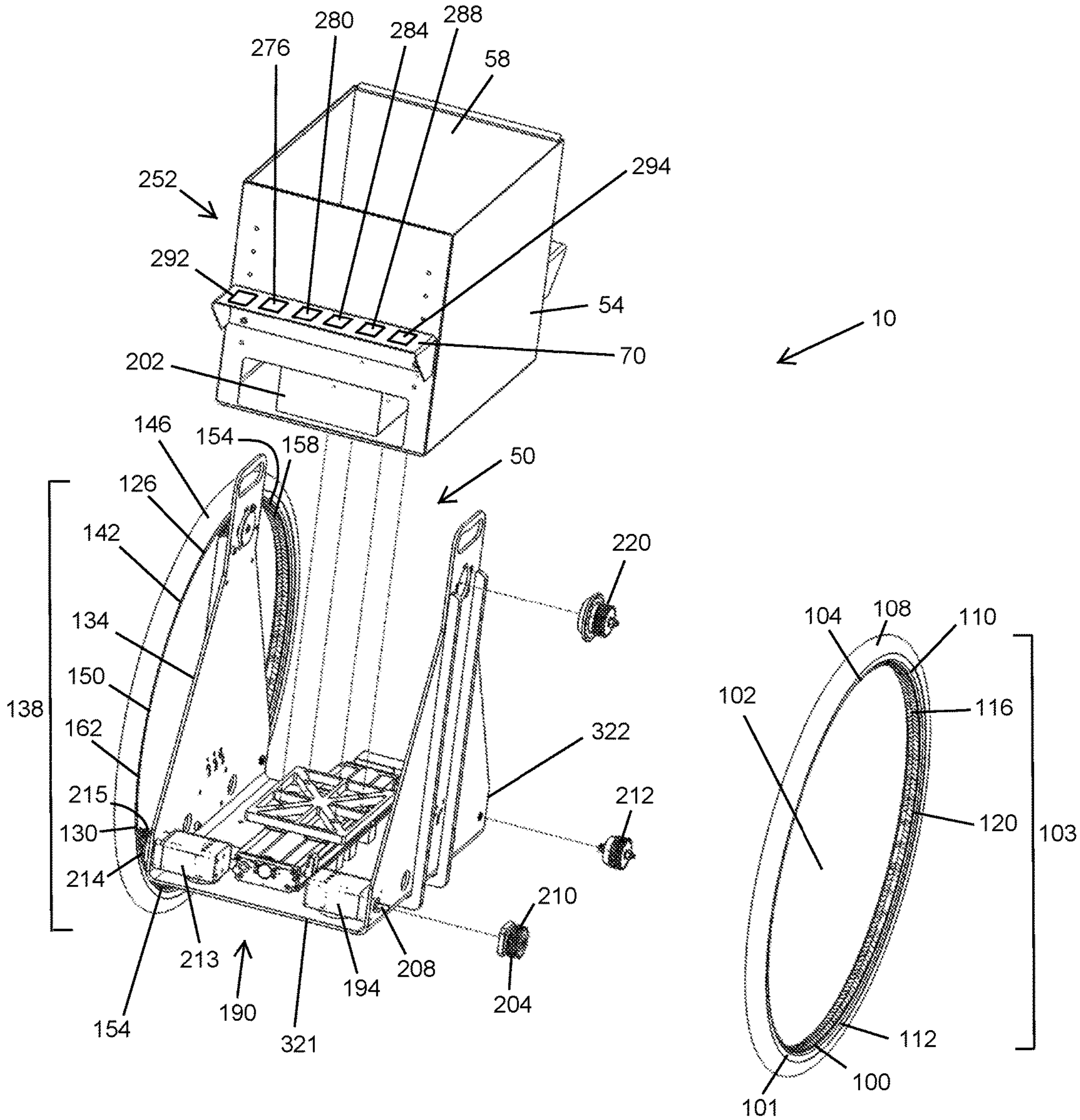
FIG. 4 is an upper perspective view of the first implementation of a vehicle, with several components isolated from the vehicle.

In certain implementations, the chassis 14 includes a cargo cavity 50, as best shown in FIGS. 2 and 4. The cargo cavity 50 is configured to support, or facilitate the support of, a cargo volume 54, in which various cargos can be stored.

In some implementations, a cargo insert 58 is removably disposed within the cargo volume 54. The cargo insert 58 is designed to support and/or secure various cargos. The cargo insert 58 includes a lip 62 that facilitates the removal of the cargo insert 58 from the cargo volume 54, and also facilitates a secure engagement between the cargo insert 58 and the cargo volume 54 when the cargo insert 58 is removably disposed within the cargo volume 54 by interfacing with an upper edge 66 of the cargo volume 54. The cargo cavity 50 also includes a sensor shelf 70 for mounting various sensors and electronic components, which will be described below. A battery channel 72 may be disposed in one or more of the cargo cavity 50, cargo volume 54 and the cargo insert 58. In some implementations, the total weight of the vehicle 10 is between 20 and 60 pounds. Additionally, various fairings (not shown) can be added to the vehicle to provide additional user interface features and performance characteristics.

In certain aspects, the present disclosure provides for a wheel 100 as best shown in FIG. 4. The wheel 100 is rotatably attached to the chassis 14. In some implementations, the wheel 100 may be rotatably attached to another part of the vehicle 10. The wheel 100 includes a perimeter 101, a geometric center 102 and a diameter 103. In some implementations, the diameter 103 is between 12 and 28 inches, inclusive. In certain implementations, the diameter of the wheel 100 is at least 75% of the height 15, length 16 and/or width 17 of the chassis 14 and/or vehicle 10. The wheel 100 also includes a rim 104 substantially defining an outer surface 110 of the wheel 100. A tire 108 is disposed around the rim 104 and may be removably mounted to the rim 104, such that the tire 108 rotates along with the rim 104. The tire 108 is made from a rubber, polymer or any other suitable material. The tire 108 serves to protect the wheel 100 and vehicle 10, and further provides a frictional contact between the wheel 100 and a ground surface to enhance the performance of the vehicle 10.

The wheel 100 also includes an inner surface 112 and the inner surface 112 is disposed on an opposite side of the wheel 100 from the outer surface 110. The inner surface 112 includes a plurality of teeth 116. The plurality of teeth 116 are connected to the rim 104 such that a rotation of the plurality of teeth 116 corresponds to a rotation of the rim 104. In some implementations, the plurality of teeth 116 are integrally formed with the inner surface 112. In some implementations, the plurality of teeth 116 are, permanently or removably, attached to the inner surface 112. In these implementations, the inner surface 112 and the plurality of teeth 116 effectively form a ring gear 120 on the inner surface 112 of the wheel 100. The plurality of teeth 116 and the inner surface 112 are formed from a metal, metal alloy, ceramic, polymer, composite material or any other suitable material.

In some implementations, the plurality of teeth 116 are disposed on a toothed belt 124, as best shown in FIG. 4. The toothed belt 124 is attached, permanently or removably, to the inner surface 112 of the wheel 100. The plurality of teeth 116 on the toothed belt 124 are connected to the rim 104 such that a rotation of the plurality of teeth 116 results in a rotation of the rim 104. The toothed belt 124 is formed of a metal, metal alloy, ceramic, polymer, composite material or any other suitable material.

The vehicle 10 includes a second wheel 126 having a second perimeter 130, a second geometric center 134 and a second diameter 138, a second rim 142, a second tire 146, a second outer surface 150, a second inner surface 154, a second plurality of teeth 158, a second ring gear 162 and a second toothed belt 166, as best shown in FIGS. 1 and 4. In some implementations, the second diameter 138 is between 12 and 28 inches, inclusive. Each of these 'second' elements connects, and operatively associates, with one another in the same manner as their above-described corresponding elements. For example, the second tire 146 and the second rim 142 connect, and operatively associate, with each other in the same manner as the tire 108 and the rim 104. A wheel axis 169 passes through the geometric center 102 of the first wheel 100 and the geometric center 134 of the second wheel.

Figure 6:
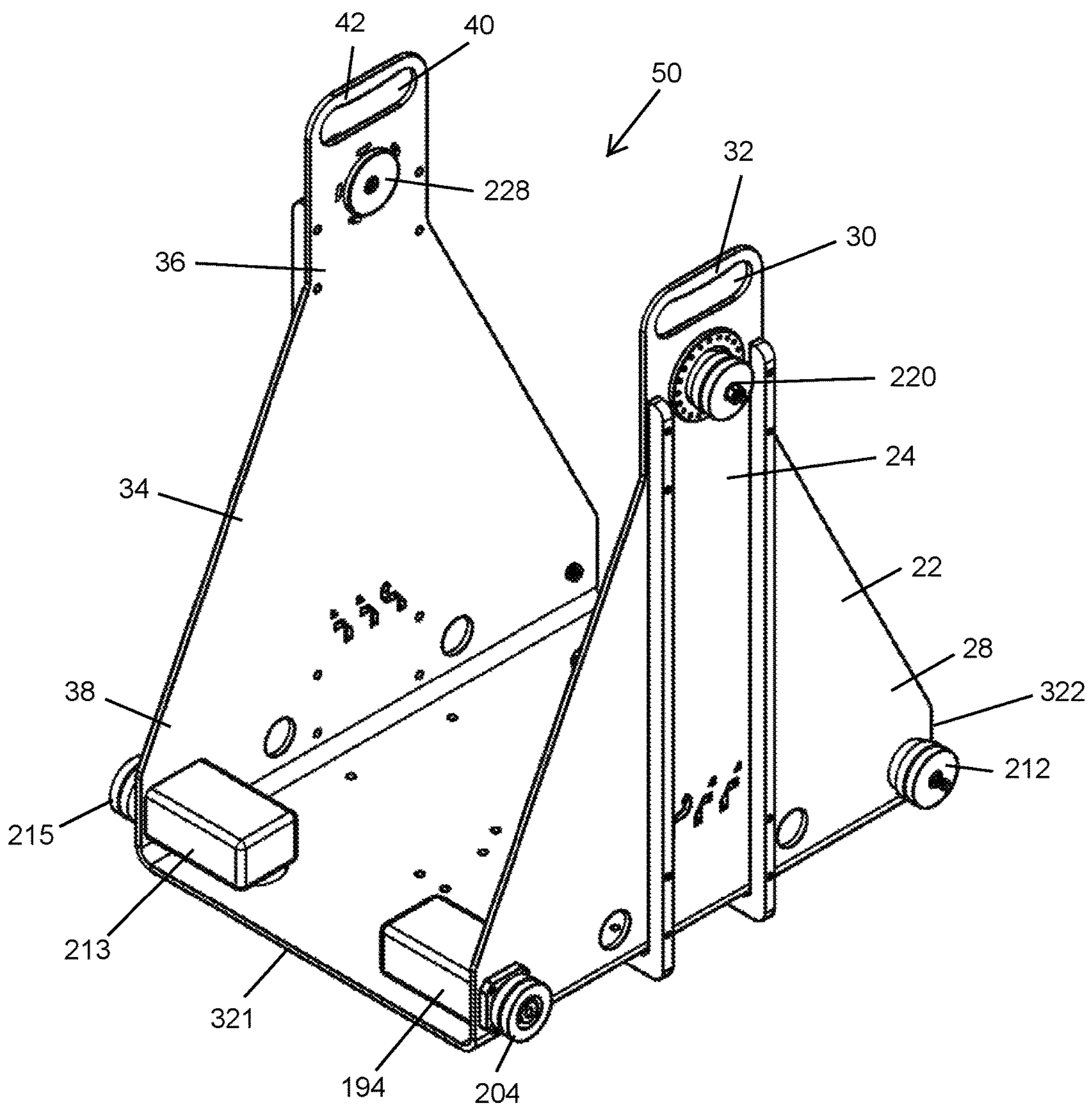
FIG. 6 is an upper perspective view of a chassis used in the first implementation of a vehicle.

Aspects of the present disclosure additionally include a drive system 190 as best shown in FIGS. 4 and 6. The drive system 190 is configured to generate a drive force and/or transmit the drive force to the wheel 100. The drive system 190 includes a motor 194, which is an electric motor. In some implementations, an internal combustion engine is also possible. The motor 194 receives electrical energy from a battery 202 or fuel cell, or fuel from a fuel source or fuel tank (not shown). The motor 194 rotates a drive gear 204 via an axle 208 disposed between the motor 194 and the drive gear 204. The drive gear 204, in certain implementations, includes teeth formed in non-linear, or angled, shapes, and the plurality of teeth 116 include mechanically engaging, or the same, shapes. The drive gear 204, in certain implementations, includes teeth formed in chevron shapes, and the plurality of teeth 116 include mechanically engaging, or the same, shapes. Additional elements, such as a transmission or gear box (not shown), may be disposed between the motor 194 and the drive gear 204 and/or may convey a drive force from the motor 194 to the drive gear 204. The drive gear 204 includes a plurality of drive gear teeth 210 that rotate along with, and are rigidly attached to, the drive gear 204.

The plurality of drive gear teeth 210 engage with, and drive, the plurality of teeth 116 of the wheel 100. In operation, the motor 194 rotates the axle 208 and the drive gear 204, which rotates the wheel 100 through the engagement of the plurality of teeth 116 and the plurality of drive gear teeth 210. An idler gear 212 also engages with the wheel 100 via the plurality of teeth 116, and is rotatably attached to the chassis 14. A second motor 213 provides a drive force to the second wheel 126 via a second axle 214 and a second drive gear 215, in a similar manner as the motor 194 and the wheel 100.

Figure 5:
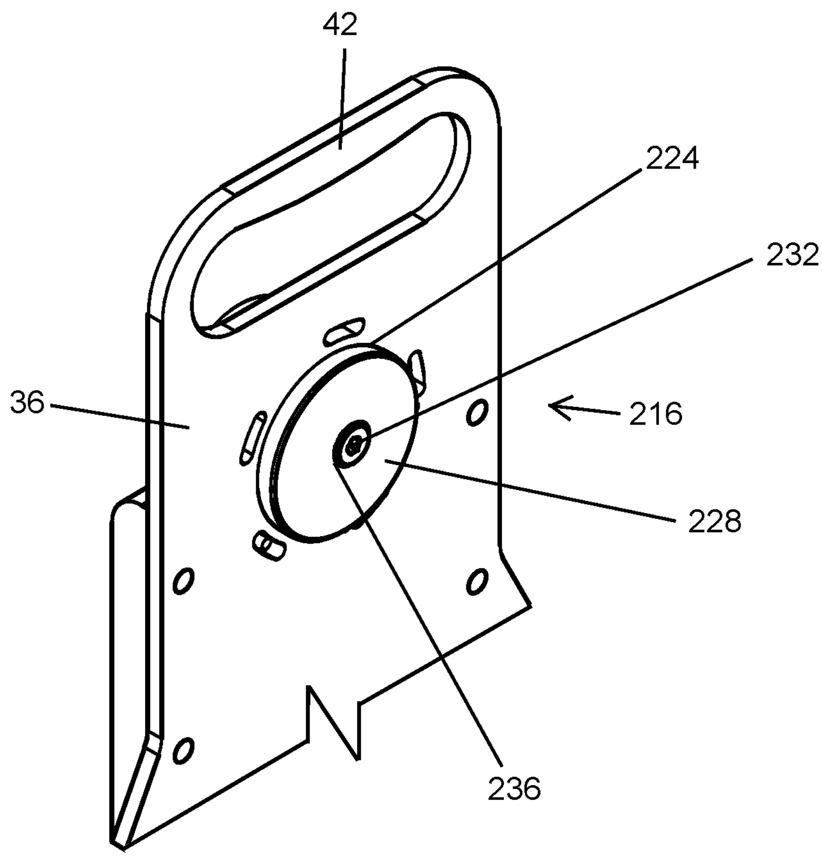
FIG. 5 is a view of a section of the first implementation of a vehicle, specifically showing aspects of a tensioning system.

Additionally, in certain implementations the vehicle 10 includes a tensioning system 216 as best shown in FIGS. 5 and 6. The tensioning system 216 includes a tensioner gear 220 and various means for tensioning the wheel 100 relative to the chassis 14, or to the drive gear 204, via the tensioner gear 220. In some implementations, the tensioning system 216 includes a tensioner gear aperture 224 located within the chassis 14. In an implementation, the tensioner gear aperture 224 is disposed within the first or second sidewall 22 or 34. A tensioner gear insert 228 is rotatably disposed in the tensioner gear aperture 224 and includes a tensioner gear mount 232. The tensioner gear 220 rotatably attaches, directly or indirectly, to the tensioner gear mount 232. The tensioner gear mount 232 is located at a location on the tensioner gear insert 228 discrete from a geometric center 236 of the tensioner gear insert 228.

When the tensioner gear insert 228 is rotated in the tensioner gear aperture 224, which may be performed manually, the location of the tensioner gear mount 232 is changed relative to the locations of the idler gear 212 and the drive gear 204. As the tensioner gear 220 is rotatably attached to the tensioner gear mount 232 away from the geometric center of the tension gear insert 228, the location of the tensioner gear 220 relative to the idler gear 212 and the drive gear 204 is changed as the tensioner gear mount 232 is rotated within the tensioner gear aperture 224. In this manner, as the wheel 100 is substantially inflexible and the locations of the idler gear 212 and the drive gear 204 are substantially fixed relative to the chassis 14, the tension of the wheel 100 when mounted to the combination of the idler gear 212, drive gear 204 and tensioner gear 220 can be adjusted by rotating the tensioner gear mount 232 within the tensioner gear aperture 224. Additionally, in an implementation, the idler gear 212, drive gear 204 and tensioner gear mount 232 generally form vertices of a substantially equilateral triangle when mounted on the chassis 14.

Figure 7:
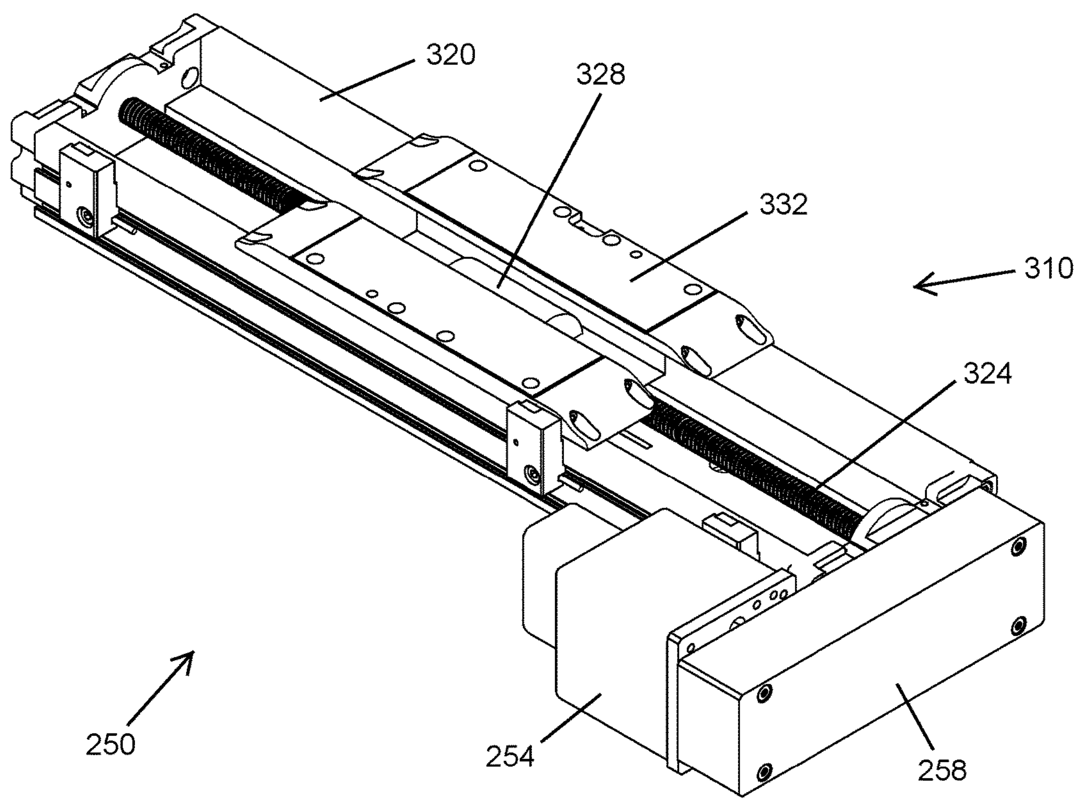
FIG. 7 is an upper perspective view of a stabilization system according to the first implementation of a vehicle.
Figure 8:
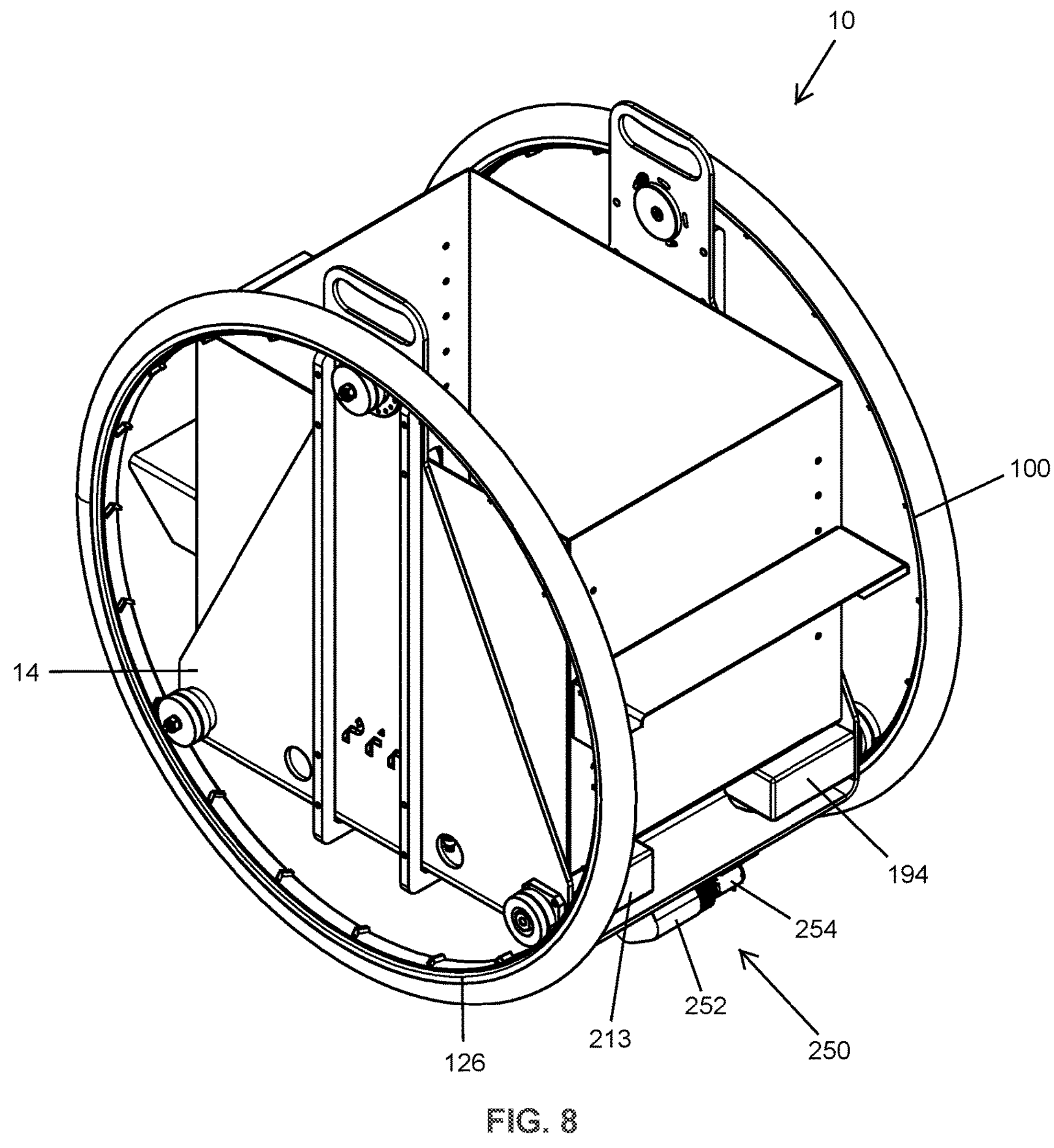
FIG. 8 is an upper perspective view of a second implementation of a vehicle.
Figure 9:
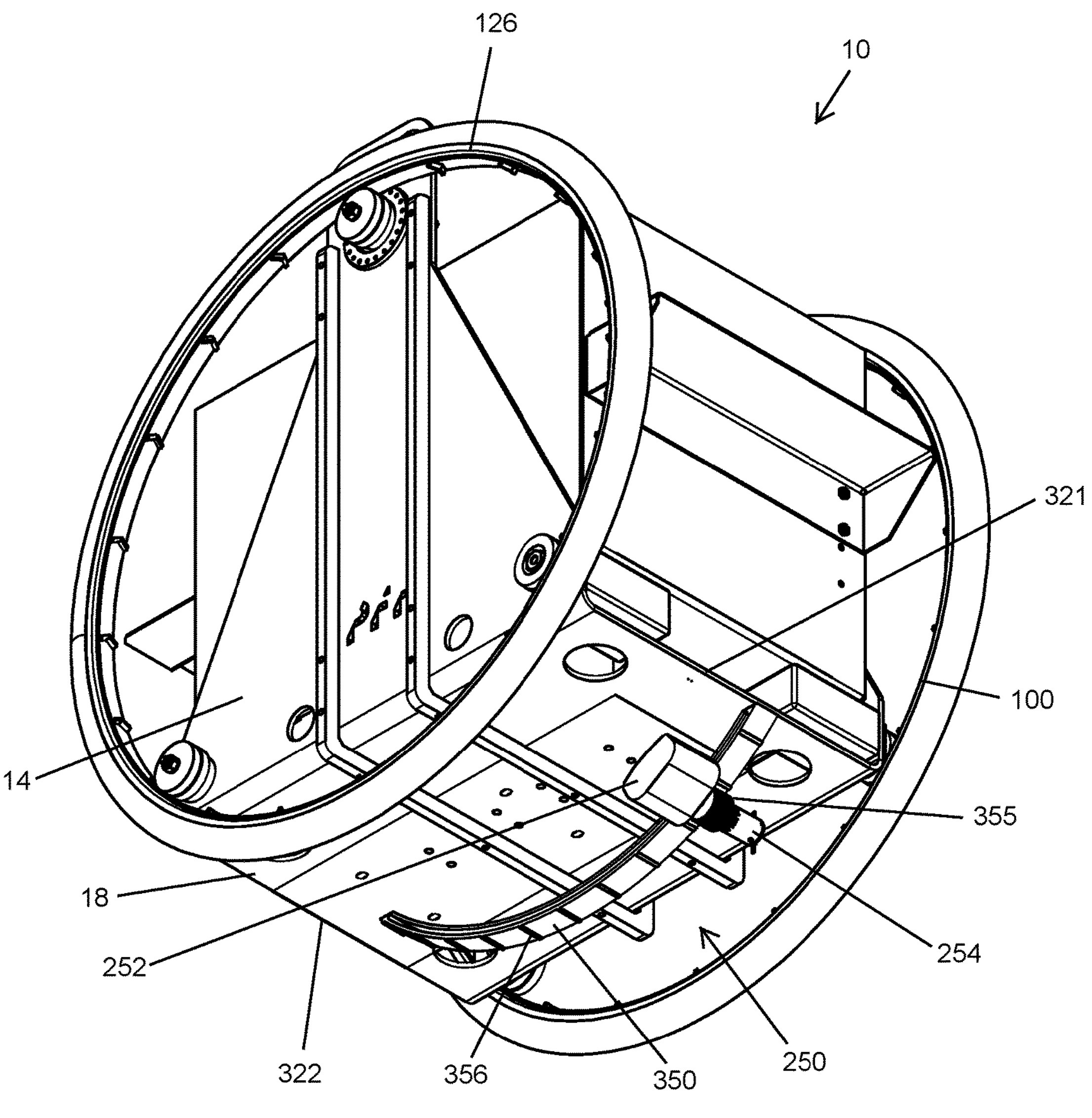
FIG. 9 is a lower perspective view of the second implementation of a vehicle.
Figure 10:
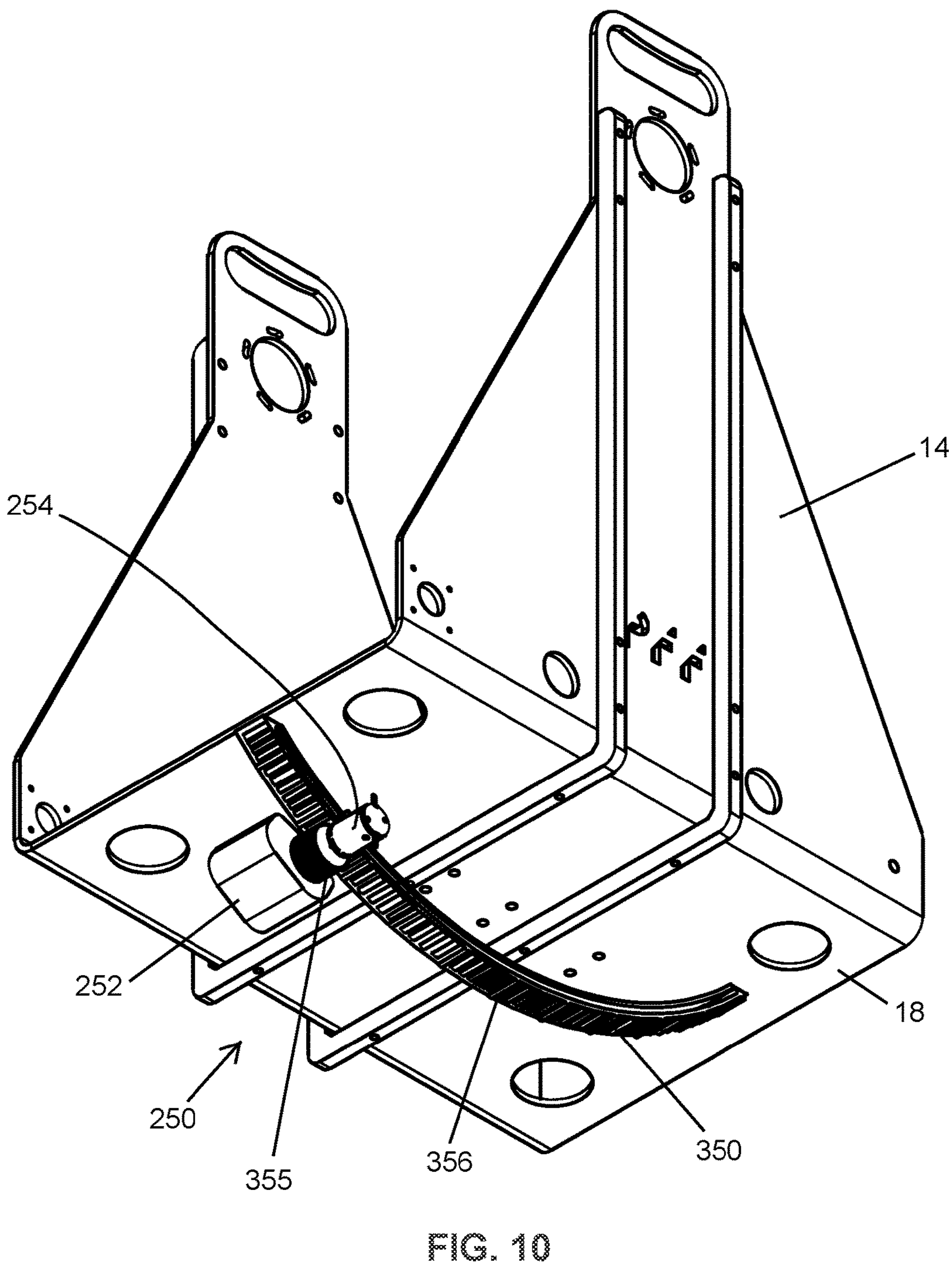
FIG. 10 is a lower perspective view of a chassis and elements of a stabilization system, as used in the second implementation of a vehicle.
Figure 11:
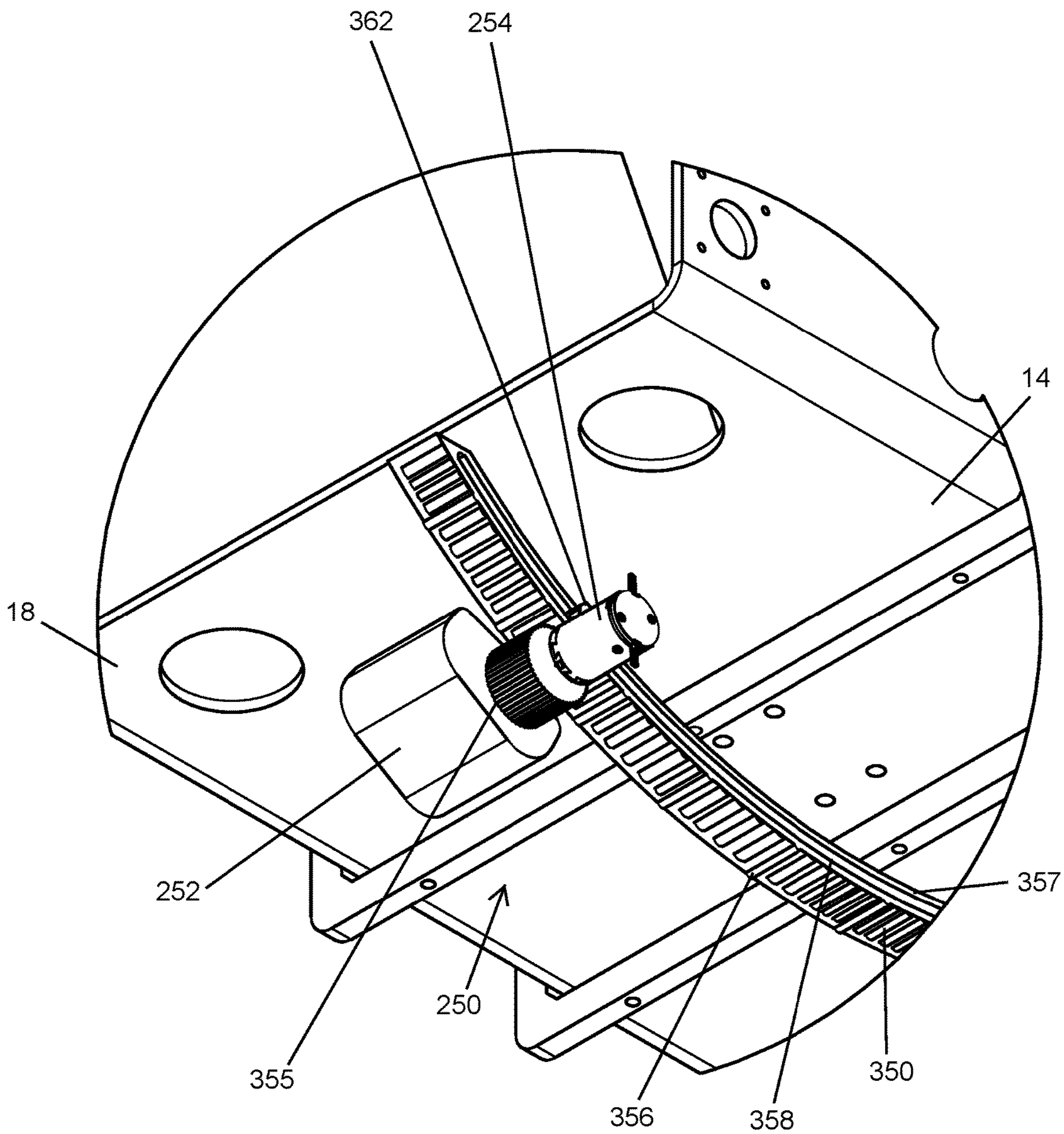
FIG. 11 is a lower perspective view of elements of a stabilization system, as used in the second implementation of a vehicle.

In some implementations, the vehicle 10 includes a stabilization system 250, as illustrated in FIG. 7. Among other features, the stabilization system 250 is configured to move, rotate and/or translate a counterweight 252. The motion of the counterweight 252 affects the center of mass of the chassis 14 and/or the vehicle 10, and therefore affects a pitch of the chassis 14 and/or the vehicle 10. A stabilization motor 254, which is an electric motor (although other motor types are within the scope of this disclosure), provides a drive force for moving the counterweight 252 via a stabilization drive 258. The stabilization drive 258 may include various elements including gears, belts, chains, pulleys, translators and/or transmissions, among other features, and will be described below in further detail.

In some implementations of the present disclosure, the vehicle 10 includes one or more sensors 276, as best shown in FIG. 4. The one or more sensors 276 include a pitch sensor 280 for sensing a pitch of the vehicle 10 and/or chassis 14. The one or more sensors 276 may also include an acceleration sensor 284 for sensing an acceleration of the vehicle 10 and/or chassis 14. The one or more sensors 276 may also include a speed sensor 288 for sensing a speed of the vehicle 10 and/or chassis 14. One or more of the sensors 276, 280, 284 and 288 may be disposed and/or secured on the sensor shelf 70. The vehicle 10 further includes a processor 292 and a memory 294 in electronic communication with the sensor 276.

The one or more sensors 276 determine and output a measurement of a state of the vehicle 10 and/or chassis 14. The determination is sent to the memory 294 and processor 292, which orders an operation of the stabilization motor 254. For example, the pitch sensor 280 determines a pitch of the vehicle 10 and/or chassis 14 and outputs the measured pitch to the memory 294 and processor 292, which command an operation of the stabilization motor. In this manner the vehicle 10 can determine, by a processor 292 and based on sensor 276 data, an orientation, acceleration or speed of the vehicle 10 and/or chassis 14. In some implementations, the sensor 276 can make multiple determinations at different times or continuously to determine a change in orientation, acceleration or speed of the vehicle 10 and/or chassis 14, or rate of change in orientation, acceleration or speed of the vehicle 10.

In some implementations, once the above determination of an orientation, acceleration or speed, or of a change (or rate of change) in the orientation, acceleration or speed, of the vehicle 10 and/or chassis 14 is made, the processor 292 and/or memory 294 control the stabilization motor 254 to move the counterweight 252 in response to the measured determination. In one aspect, the processor 292 and/or memory 294 control the stabilization motor 254 to move the counterweight 252 to maintain a substantially constant vehicle 10 and/or chassis 14 orientation about an axis 300 passing through the geometric centers 102, 134 of the first and second wheels 100, 126. In some implementations, the counterweight 252 is coupled to the chassis 14 such that the counterweight 252 can adjust an orientation of the vehicle 10 and/or chassis 14 in response to a change in pitch of the vehicle 10 and/or chassis 14 about an axis 300 passing through the geometric centers 102, 134 of the first and second wheels 100, 126.

In some implementations of the present disclosure, once the above determination of an orientation, acceleration or speed, or of a change in the orientation, acceleration or speed, of the vehicle 10 and/or chassis 14 is made, the processor 292 and/or memory 294 control the motor 194 to move the wheel 100 in response to the measured determination. In some implementations, once the above determination of an orientation, acceleration or speed, or of a change in the orientation, acceleration or speed, of the vehicle 10 and/or chassis 14 is made, the processor 292 and/or memory 294 control the stabilization motor 254 to move the counterweight 252 in response to the measured determination and further control the motor 194 to move the wheel 100 in response to the measured determination.

In some implementations, a motion of the counterweight 252 can be determined using various algorithms. In one example, acceleration of the vehicle 10 can be characterized by solving a torque balance equation. The resultant equation of motion is represented by Equation 1, shown below, in some implementations:

$$R=(1/I\_robot)[\tau\_motor-(m\_chassis L\_chassis+m\_payload L\_payload)\sin\theta-m\_payload x\cos\theta-C\_damping R] \quad \text{Equation 1}$$

In Equation 1, R=Rotational acceleration of chassis and payload, I_robot=Rotational moment of inertia of chassis and payload, τ_motor=Torque of the motor, m_chassis=Mass of the chassis, L_chassis=Distance from origin to center of chassis (positive down), m_payload=Mass of the payload (cargo), L_payload=Vertical distance from origin to center of payload (positive down), x=Horizontal distance from origin to center of payload (positive forward), and C_damping=Damping coefficient, proportional to angular velocity.

From the calculation of Equation 1, "R", or the rotational acceleration of the chassis and payload, can be used to determine a movement of the counterweight 252. A proportional-integral-derivative (PID) controller can be used with a simple formulation, represented by Equation 2, illustrated below:

$$H=P\theta+I\int〚\theta dt+DR〛 \quad \text{Equation 2}$$

In Equation 2, P=Proportional gain, I=Integral gain, dt=time increment, D=Derivative gain, H=movement of the counterweight 252.

In some implementations, the counterweight 252 is moved along a track 310 by the stabilization motor 254. The track 310 may be disposed on the chassis 14 or on another part of the vehicle 10.

In one aspect of the present disclosure, the vehicle 10 includes a linear track 320 as best shown in FIGS. 1-7. The linear track 320 is disposed longitudinally on the chassis 14 and extends toward a front of the chassis 321 and toward a rear of the chassis 322. The linear track 320 is disposed between the chassis 14 and the cargo volume 54, and is also attached to the chassis floor 18. A worm gear 324 is disposed within the linear track 320. In some implementations, the stabilization motor 254 rotates the worm gear 324 via a belt (not shown). A translator 328 is rotatably connected with the worm gear 324 and is translated along the worm gear 324 as the worm gear 324 rotates. A slider 332 is attached, directly or indirectly, to the translator 328 such that the slider 332 moves with the translator 328 as the translator 328 is translated along the worm gear 324 upon a rotation thereof. Further, a mount 336 is attached to the slider 332 and moves along with the slider 332. The mount 336 also attaches to the cargo volume 54, which moves along with the mount 336. The cargo volume 54, any contents therein and/or the translating elements (328, 332, 336) thus comprise the counterweight 252. In other embodiment, a rack-and-pinion arrangement could be used to move the counterweight 252.

In this arrangement, the stabilization motor 254 moves the translator 328, and thus the counterweight 252, towards the front and rear of the chassis 321, 322. In some implementations, the stabilization motor 254 moves the translator 328, and thus the counterweight 252, towards the front and rear of the chassis 321, 322 in response to a determination of an orientation, acceleration or speed, or of a change in the orientation, acceleration or speed, of the vehicle 10 and/or chassis 14 made by the sensor 276, and to a corresponding command from the processor 292 and/or memory 294. In some implementations, the battery 202 is the counterweight 252, and is thus moved towards the front and rear of the chassis 321, 322 by the stabilization motor 254. In some implementations, the battery 202 is moved towards the front and rear of the chassis 321, 322 within the battery channel 72 by the stabilization motor 254. Further, in some implementations, the battery 202 is disposed below the chassis 14.

In some implementations of the present disclosure, the vehicle 10 includes an arcuate track 350 as best shown in FIGS. 8-11. The arcuate track 350 is disposed substantially longitudinally on the chassis 14 and extends toward the front of the chassis 321 and toward the rear of the chassis 322. The arcuate track 350 is disposed below the chassis floor 18 and is further attached to the chassis floor 18. However, the arcuate track 350 may also be disposed at other locations on the vehicle 10 or chassis 14. The counterweight 252 is attached to the stabilization motor 254, and the attached counterweight 252 and stabilization motor 254 travel along an arcuate path, and/or along the arcuate track 350, through a drive force generated by the stabilization motor 254. In particular, the stabilization motor 254 rotates a travelling gear 355 rotatably connected with the stabilization motor 254. The travelling gear 355 engages with a plurality of arcuate teeth 356 disposed along a side of the arcuate track 350. A curved member 357 is disposed proximate to a side of the arcuate track 350 and is spaced a distance from the arcuate track 350, thus forming an arcuate slot 358 between the arcuate track 350 and the curved member 357. A retaining member 362 connected to the counterweight 252 and/or the stabilization motor 254 is disposed within the arcuate slot 358 and, by various means including an interlocking fit with the arcuate track 350 and/or arcuate slot 350 or a mechanically biased or interfering relationship with the arcuate track 350 and/or the curved member 357, retains the retaining member 362, counterweight 252 and stabilization motor 254 to the arcuate track 350 as the retaining member 362, counterweight 252 and stabilization motor 254 travel along an arcuate path along the arcuate track 350.

In some implementations, the stabilization motor 254 moves the counterweight 252 along an arcuate path. Further, in some implementation, the stabilization motor 254 moves the counterweight 252 along the arcuate track 350 and towards the front and rear of the chassis 321, 322. In some implementations, the stabilization motor 254 moves the counterweight 252 towards the front and rear of the chassis 321, 322 in response to a determination of an orientation, acceleration or speed, or of a change in the orientation, acceleration or speed, of the vehicle 10 and/or chassis 14 made by the sensor 276, and to a corresponding command from the processor 292 and/or memory 294. In some implementations, the battery 202 is disposed below the chassis 14. In some implementations, a motion of the counterweight 252 can be determined using various algorithms. In some implementations, a motion of the counterweight 252 can be determined using a proportional-integral-derivative (PID) controller algorithm.

Figure 12:
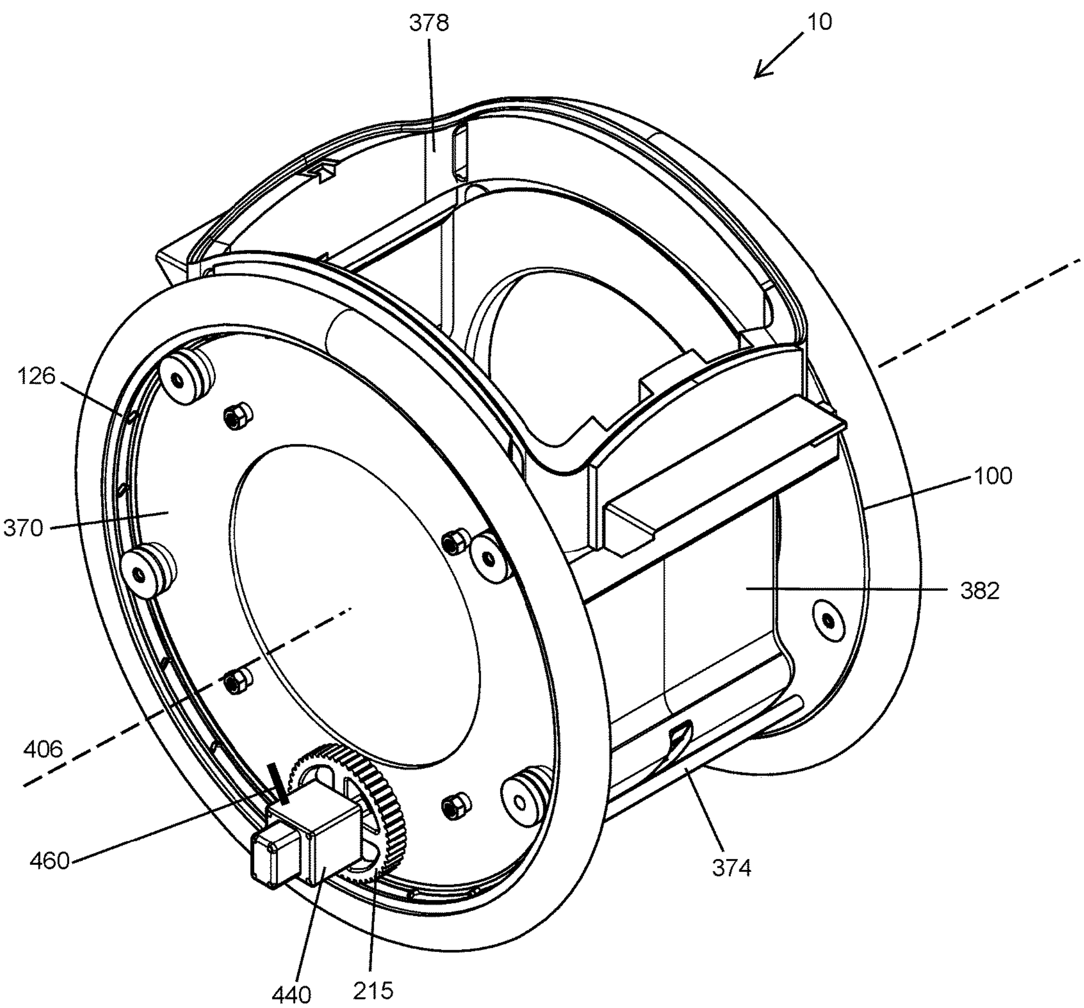
FIG. 12 is an upper perspective view of a third implementation of a vehicle.
Figure 13:
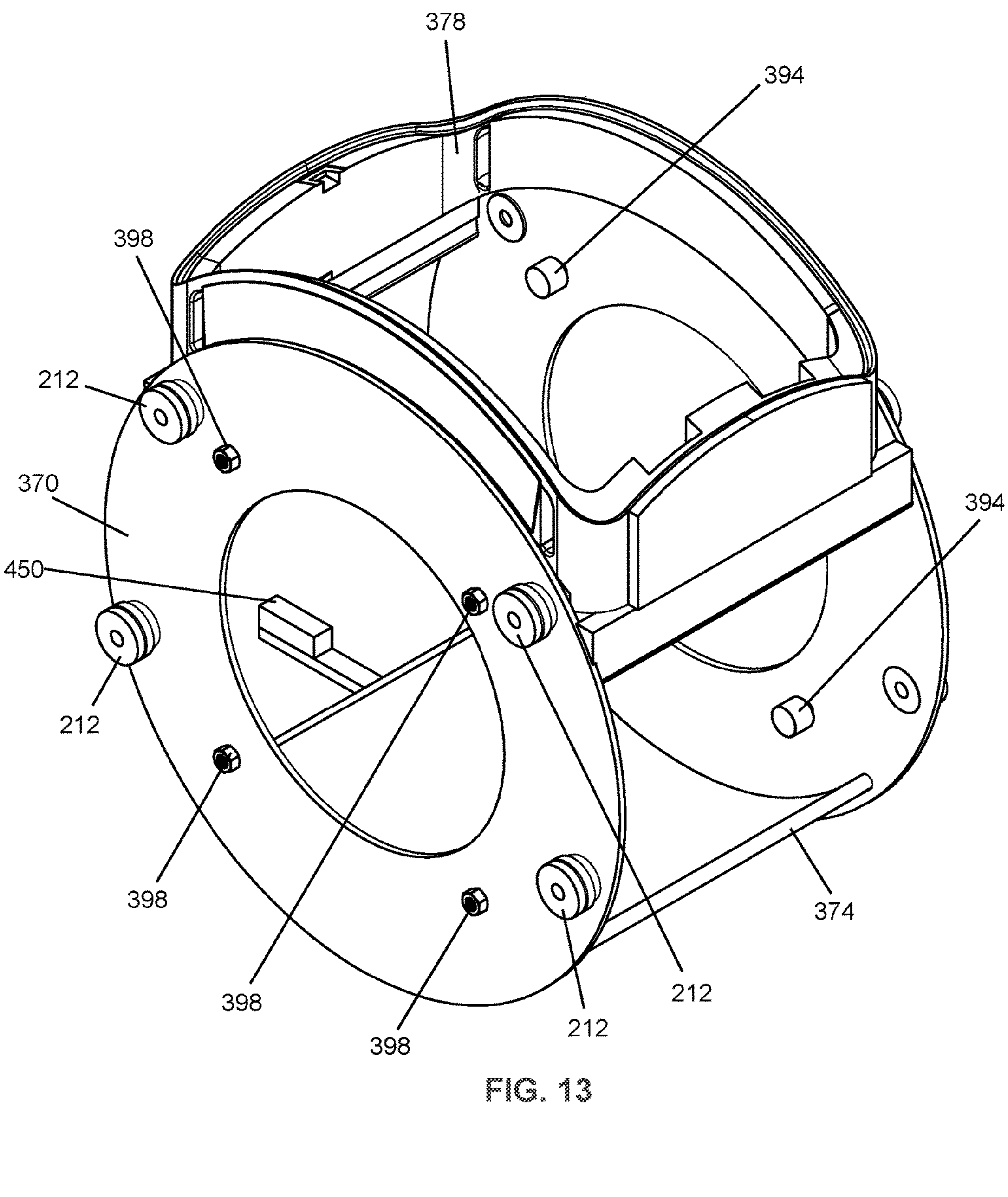
FIG. 13 is an upper perspective view of the third implementation of a vehicle, with certain elements removed for clarity.
Figure 14:
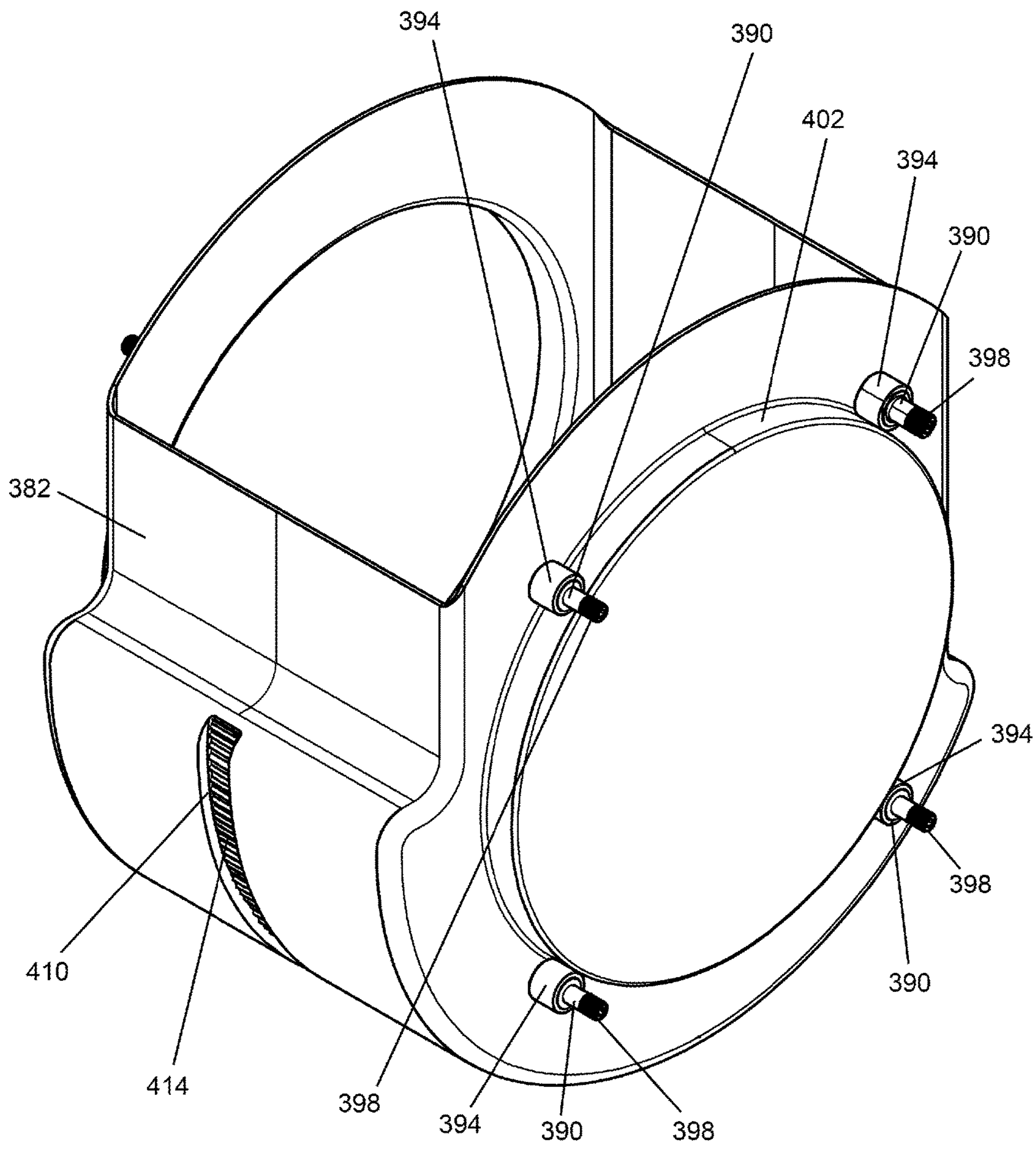
FIG. 14 is an upper perspective view of a cargo container as used with the third implementation of a vehicle.
Figure 15:
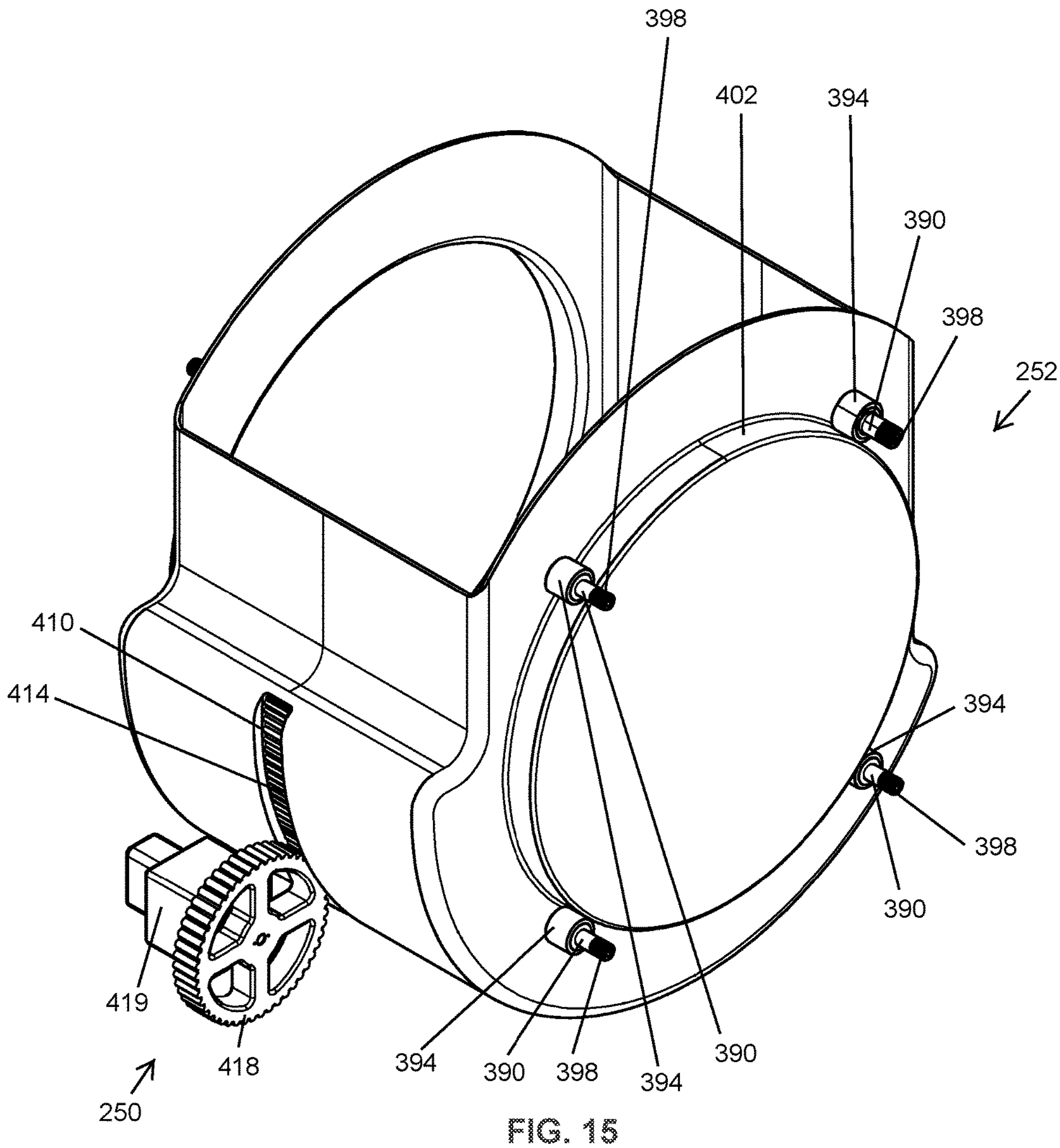
FIG. 15 is an upper perspective view of a cargo container as used with the third implementation of a vehicle, further showing elements of a stabilization system.

In some implementations of the present disclosure, the vehicle 10 includes a harness 370 as best shown in FIGS. 12-15. The harness 370 includes a plurality of cross members 374. A yoke 378 is rigidly attached to the harness 370 such that the yoke 378 and harness 370 rotate and move together. As shown in FIGS. 12, 14 and 15, a cargo container 382 is provided, and is rotatably disposed within the harness 370 and below the yoke 378. In some implementations, a plurality of rollers 390 rotatably suspends and supports the cargo container 382 within the harness 370. Each roller 390 includes a rotational end 394 and an opposite end 398. Each opposite end 398 is attached to the harness 370 and each rotational end 394 projects inward from the harness 370, as best shown in FIGS. 13-15. Each rotational end 394 rotates relative to each respective opposite end 398. Each rotational end 394 rotatably suspends and supports the cargo container 382, and rotatably interacts with a roller track 402 disposed on the cargo container 382, as best shown in FIGS. 14 and 15. When suspended and supported by the rollers 390, the cargo container 382 rotates about a cargo container axis 406. The cargo container further includes a groove 410 including a plurality of groove teeth 414. The groove teeth 414 mechanically engage with a stabilization drive gear 418, which is rotated by a cargo container motor 419. The cargo container motor 419, a harness motor (not shown) and a second harness motor 440 are attached to the harness 370 and/or the yoke 378. The harness motor (not shown) and the second harness motor 440 are attached to the harness 370 on an exterior side of the harness 370, and are positioned relative to the harness as best shown in FIG. 12. The second harness motor 440 is attached to the harness 370 via a second harness motor mount 460. One or more idler gears 212 are also rotatably attached to the harness 370. In this arrangement, the cargo container 382 and any contents therein, functions as the counterweight 252. Further, the cargo container motor 419 is attached to a portion of the harness 370 and/or yoke 378. Additionally, the cargo container motor 419 may attach to the harness 370 via a harness attachment mount 450, as best shown in FIG. 13.

In this arrangement, the cargo container motor 419 rotates the cargo container 382, or counterweight 252, about the cargo container axis 406 according to a drive force provided by the cargo container motor 419. In some implementations, the cargo container motor 419 moves the cargo container 382, or counterweight 252, about the cargo container axis 406 in response to a determination of an orientation, acceleration or speed, or of a change in the orientation, acceleration or speed, of the vehicle 10 and/or chassis 14 made by the sensor 276, and to a corresponding command from the processor 292 and/or memory 294. In some implementations, the battery 202 is disposed within the cargo container 382. Further, in some implementations, the battery 202 is disposed below the cargo container 382. In some implementations, a motion of the counterweight 252 can be determined using various algorithms. In some implementations, a motion of the counterweight 252 can be determined using a proportional-integral-derivative (PID) controller algorithm.

The disclosed systems and methods are well adapted to attain the ends and advantages mentioned as well as those that are inherent therein. The particular implementations disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative implementations disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A two-wheeled vehicle, comprising:

a chassis having a height, a length and a width;

a first wheel rotatably connected to the chassis, the first wheel having a perimeter, a diameter and a geometric center, and the diameter of the first wheel being at least 75% of the height of the chassis;

a motor for providing a drive energy to the first wheel;

an axle rotated by the motor;

a drive gear connected with the axle such that the drive gear rotates with a rotation of the axle; and a plurality of teeth disposed about the first wheel and mechanically engaged with the drive gear at a location closer to the perimeter of the first wheel than to the geometric center of the first wheel; and a tensioner gear and an idler gear coupled to the chassis, wherein the tensioner gear, idler gear and drive gear couple to the chassis at positions that correspond to vertices of a substantially equilateral triangle.

2. The two-wheeled vehicle of claim 1, wherein the plurality of teeth mechanically engage with the drive gear at about the perimeter of the first wheel.

3. The two-wheeled vehicle of claim 2, comprising a ring gear including the plurality of teeth coupled to an inner surface of the first wheel.

4. The two-wheeled vehicle of claim 2, wherein the plurality of teeth are disposed on a drive belt affixed to an inner surface of the first wheel.

5. The two-wheeled vehicle of claim 1, wherein the tensioner gear and idler gear are mechanically engaged with the plurality of teeth disposed about the first wheel.

6. The two-wheeled vehicle of claim 5, wherein a tensioner gear insert rotatably mounts the tensioner gear at a location discrete from a geometric center of the tensioner gear insert, such that a rotation of the tensioner gear insert adjusts the tension of wheel relative to the idler gear and the drive gear.

7. The two-wheeled vehicle of claim 1, comprising a cargo volume supported by the chassis.

8. The two-wheeled vehicle of claim 7, comprising a cargo insert removably disposed within the cargo volume.

9. The two-wheeled vehicle of claim 1, wherein the two-wheeled vehicle includes a pitch sensor for sensing a pitch of the chassis.

10. The two-wheeled vehicle of claim 9, wherein the two-wheeled vehicle includes a stabilization system configured to move a counterweight along a linear track responsive to an output of the pitch sensor for adjusting an orientation of the chassis.

11. The two-wheeled vehicle of claim 9, wherein the two-wheeled vehicle includes a stabilization system configured to rotate a cargo container about a cargo container axis responsive to an output of the pitch sensor for adjusting an orientation of the chassis.

12. The two-wheeled vehicle of claim 9, wherein the two-wheeled vehicle includes a stabilization system configured to move a counterweight along an arcuate track responsive to an output of the pitch sensor for adjusting an orientation of the chassis.

13. The two-wheeled vehicle of claim 1, wherein the diameter of the first wheel is at least 75% of the length of the chassis.

14. The two-wheeled vehicle of claim 1, further comprising:

a second wheel rotatably connected to the chassis on an opposite side of the chassis from the side of the chassis rotatably connected to the first wheel, the second wheel having a perimeter, a diameter, and a geometric center; and a second motor for providing a drive energy to the second wheel, independent of the motor providing the drive energy to the first wheel, via a second drive gear, wherein the second drive gear is mechanically engaged with the second wheel at a location closer to the perimeter of the second wheel than to the geometric center of the second wheel.

15. A two-wheeled vehicle, comprising:

a chassis having a height, a length and a width;

a first wheel rotatably connected to the chassis, the first wheel having a perimeter, a diameter and a geometric center, and the diameter of the first wheel being at least 75% of the height of the chassis;

at least one motor configured to provide a drive energy to the first wheel, said at least one motor being coupled to the chassis;

a drive gear configured to couple the at least one motor to the first wheel, said drive gear mechanically engaging with the first wheel at a location closer to the perimeter of the first wheel than to the geometric center of the first wheel; and a tensioner gear and an idler gear coupled to the chassis, wherein the tensioner gear, idler gear and drive gear couple to the chassis at positions that correspond to vertices of a substantially equilateral triangle.

16. The two-wheeled vehicle of claim 15, further including at least one tensioner configured to tension the first wheel relative to the chassis and the drive gear.

17. The two-wheeled vehicle of claim 15, further including at least one pitch sensor configured to sense a pitch of the chassis and at least one stabilizer configured to adjust an orientation of the chassis responsive to an output of the at least one pitch sensor.

18. The two-wheeled vehicle of claim 17, wherein the at least one stabilizer includes a counterweight movable along a track.

19. The two-wheeled vehicle of claim 15, wherein the chassis further includes a cargo-carrying container.

20. A two-wheeled vehicle, comprising:

a chassis having a height, a length and a width;

a first wheel rotatably connected to the chassis, the first wheel having a perimeter, a diameter and a geometric center, and the diameter of the first wheel being at least 75% of the height of the chassis;

a motor for providing a drive energy to the first wheel;

an axle rotated by the motor;

a drive gear connected with the axle such that the drive gear rotates with a rotation of the axle;

a plurality of teeth disposed about the first wheel and mechanically engaged with the drive gear at a location closer to the perimeter of the first wheel than to the geometric center of the first wheel; and a tensioner gear and an idler gear coupled to the chassis, wherein the tensioner gear and idler gear are mechanically engaged with the plurality of teeth disposed about the first wheel, wherein the tensioner gear, idler gear and drive gear couple to the chassis at positions that correspond to vertices of a substantially equilateral triangle.

21. The two-wheeled vehicle of claim 20, wherein the two-wheeled vehicle includes a pitch sensor for sensing a pitch of the chassis.

* * * * *